(No Model.) 5 Sheets—Sheet 1.
T. C. HUGHES & A. W. ADAMS.
CONDUIT ELECTRIC RAILWAY.
No. 536,952. Patented Apr. 2, 1895.
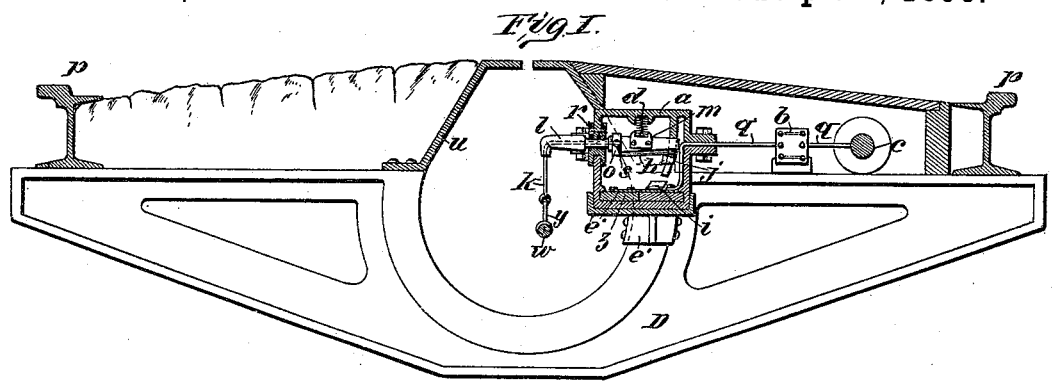
Fig. I.
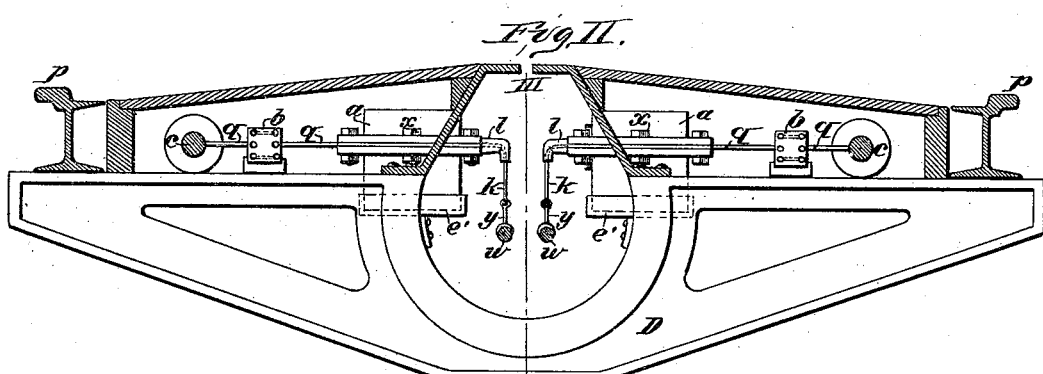
Fig. II.
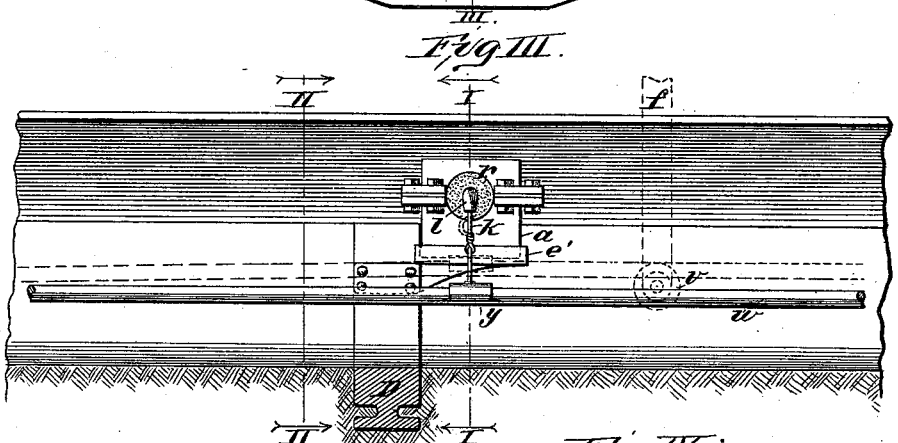
Fig. III.
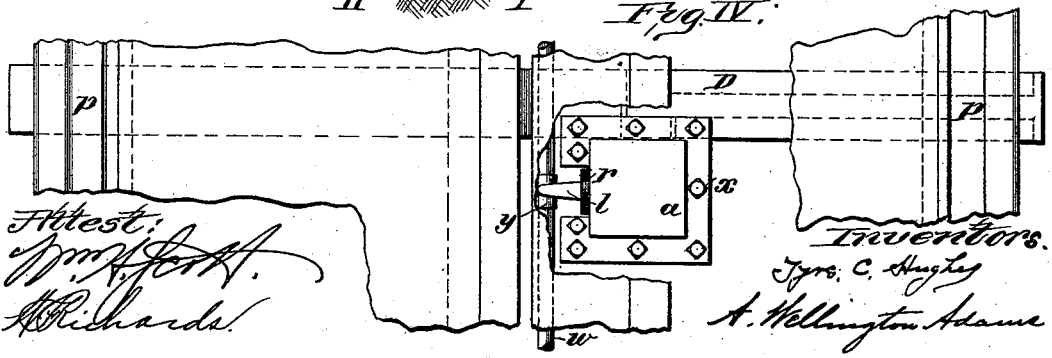
Fig. IV.
Attest:
Wm. N. Scott
H. Richards
Inventors:
Tyro. C. Hughes
A. Wellington Adams
THE NORRIS PETERS CO., PHOTO-LITHO., WASHINGTON, D. C.

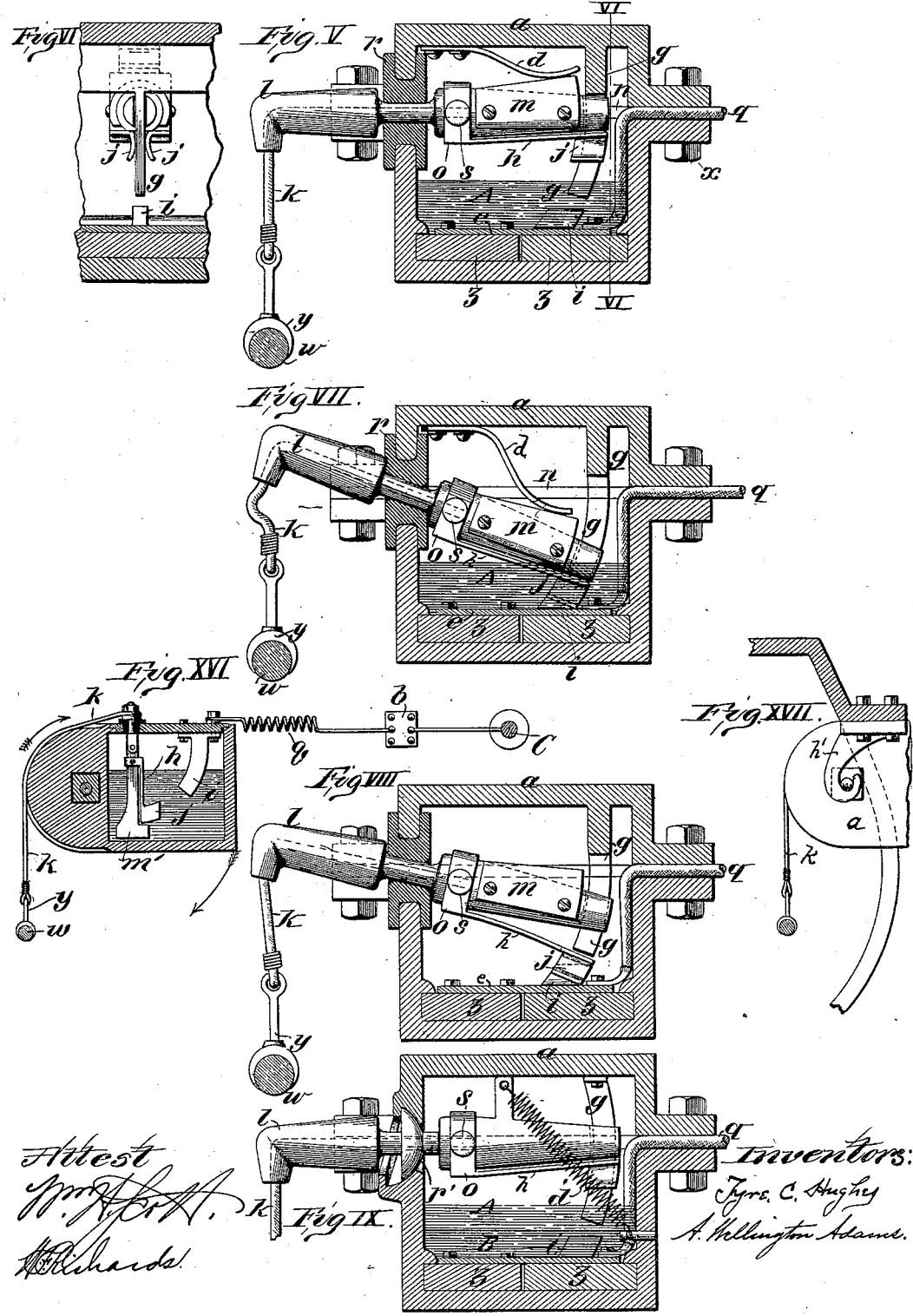

(No Model.) 5 Sheets—Sheet 3.
T. C. HUGHES & A. W. ADAMS.
CONDUIT ELECTRIC RAILWAY.
No. 536,952. Patented Apr. 2, 1895.
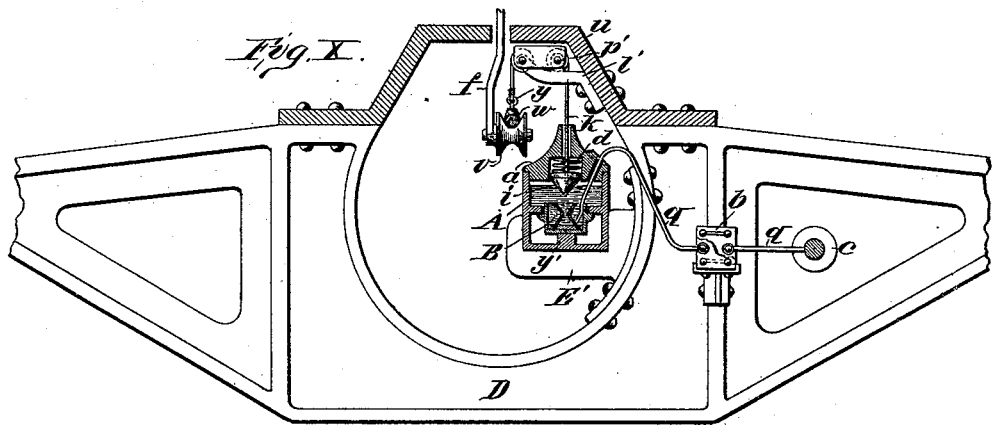
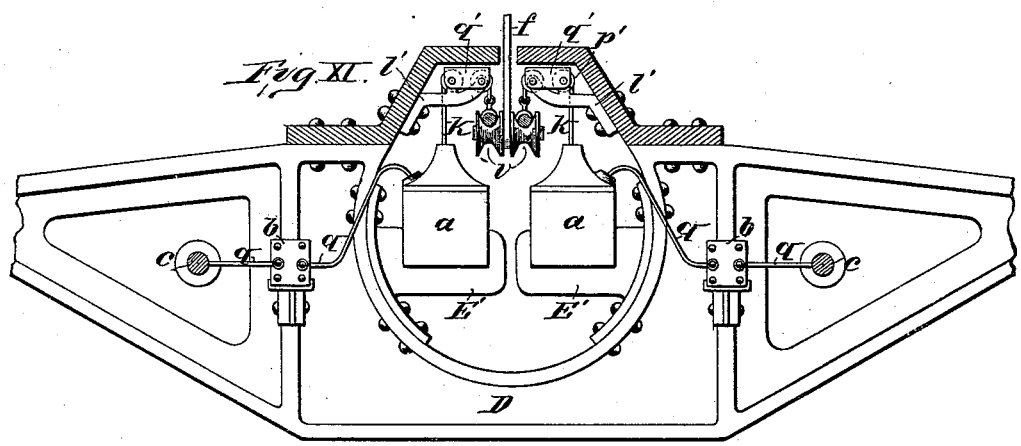
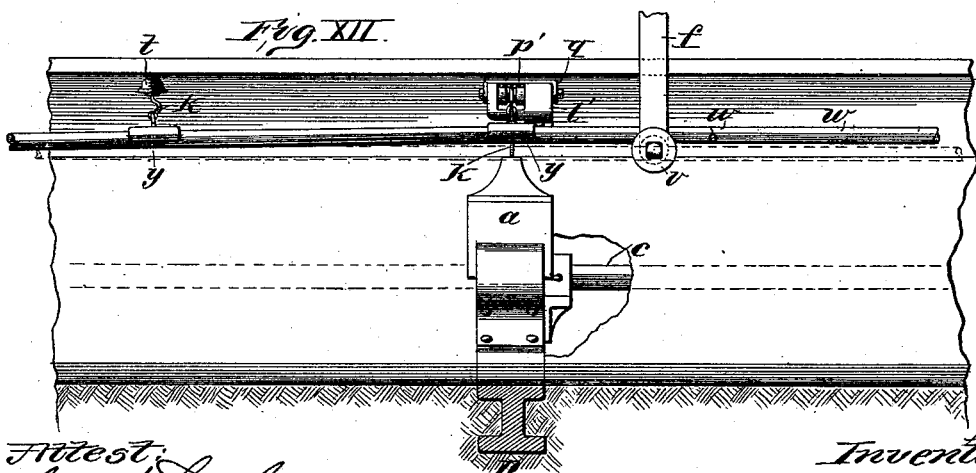

(No Model.) 5 Sheets—Sheet 4.
T. C. HUGHES & A. W. ADAMS.
CONDUIT ELECTRIC RAILWAY.
No. 536,952. Patented Apr. 2, 1895.
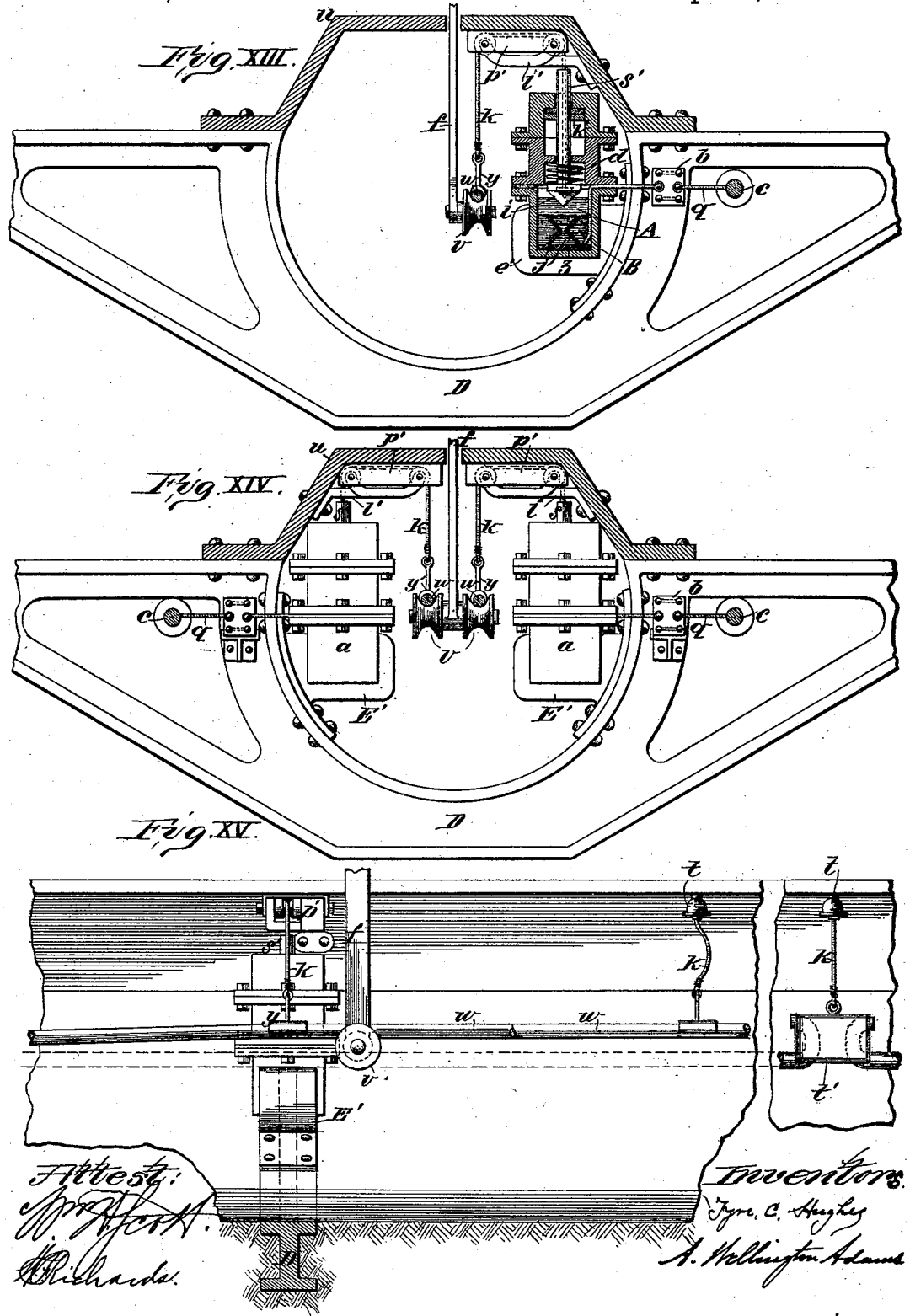

(No Model.) 5 Sheets—Sheet 5.
T. C. HUGHES & A. W. ADAMS.
CONDUIT ELECTRIC RAILWAY.
No. 536,952. Patented Apr. 2, 1895.
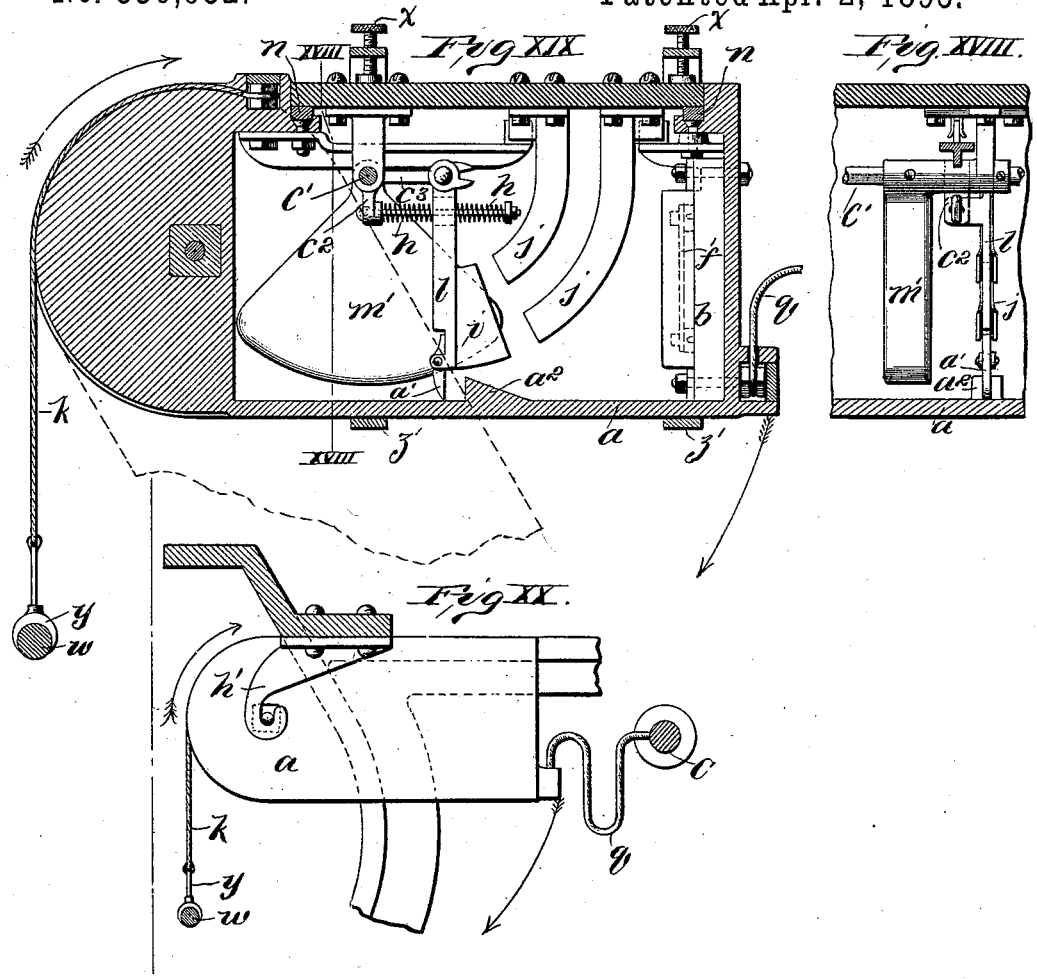
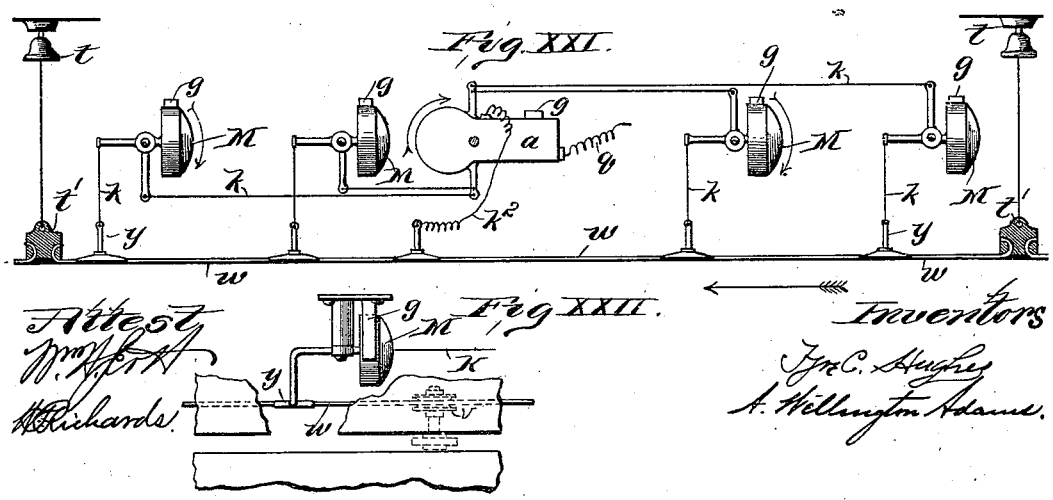

UNITED STATES PATENT OFFICE.

TYRE C. HUGHES AND ARTHUR WELLINGTON ADAMS, OF ST. LOUIS, MISSOURI, ASSIGNORS OF ONE-HALF TO EWING HILL AND E. C. SMITH, OF SAME PLACE.

CONDUIT ELECTRIC RAILWAY.

SPECIFICATION forming part of Letters Patent No. 536,952, dated April 2, 1895.

Application filed February 12, 1894. Serial No. 499,934. (No model.)

*To all whom it may concern:*

Be it known that we, TYRE C. HUGHES and ARTHUR WELLINGTON ADAMS, of the city of St. Louis and State of Missouri, have invented certain new and useful Improvements in Conduit Electric Railways, of which the following is a full, clear, and accurate description thereof, reference being had to the accompanying drawings, forming a part hereof.

Heretofore, in conduit electric railways employing a bare trolley conductor supplying the motor upon the car, the trolley wire has been supplied with current, either directly, or taken from boxes situate at intervals along the line of the railway, said boxes being supplied either direct or by branch circuits from an insulated cable running the length of road and connected with the dynamo at the generating station, the contact between the supply current from the generating station and the trolley wire, or conductor, being made in boxes either by the action of magnetic attraction, or positive mechanical motion. In all such devices the contact pieces located inside the boxes, are placed on solid insulators, or solid insulating material, each box supplying one section of trolley wire with current, and being normally out of contact. Otherwise, the trolley wire is made continuous and supplied direct with current from the dynamo at the generating station. The objections to these methods are, first, the insulators being of a non fluid character become covered with moisture, and thus allow of a large leakage of current to ground; second, if the contact is made in a closed box by magnetic or electrical means, there arises a great uncertainty in its operation, and, third, if the contact is made by positive mechanical motion, a greater difficulty is met in providing a trolley or contact shoe always at the exact and necessary height or position to operate the switch mechanism and form contact in the boxes and yet not injure the mechanism. A further objection is the general inefficiency of the systems using continuously charged bare conductors, to illustrate which we may give an example. Suppose a conduit system with a continuous conductor of forty thousand feet, charged with one thousand horse power continuously (exclusive of losses due to resistance, &c.) Suppose fifty cars to operate over this line, each car using on an average eight horse power. Let the cars run at eight hundred feet headway. These fifty cars then absorb four hundred horse power. Let the efficiency of this line be taken at five per cent., (exclusive of losses due to resistance, &c.) The system then lacks three hundred and fifty horse power of being able to supply the cars. Now, suppose you divide this conductor into four hundred sections of one hundred feet each, each section insulated from the others. Allow in each supposed system the same loss per one hundred feet of wire in circuit, which is, in the first case, found to be two and three eighths horse power. In the first case we lose, then, nine hundred and fifty horse power out of one thousand; in the latter we lose one hundred and eighteen horse power out of a necessary five hundred and eighteen required to operate the cars and supply such loss. In the first case we get five per cent. efficiency, in the latter we get seventy-seven per cent. efficiency. On this showing it is evidently necessary to divide the trolley conductor into sections insulated from each other.

It is the object of our device to provide a mechanism which will avoid these difficulties and at the same time have an insulation not affected by moisture, and whose mechanism can be placed in the ordinary cable railway conduits as they are now built, and not require a nice adjustment and accurate relationship between the moving contact and the switch mechanism.

In the accompanying drawings illustrating our invention, of which there are five sheets, similar parts are correspondingly lettered in the several figures.

Figure I represents a cross section of an ordinary cable railway conduit, to which is applied our invention. Fig. II represents a cross section of an ordinary cable railway conduit to which is applied our invention and in which is shown in elevation switch boxes *a* forming a part thereof. Fig. III is a longitudinal sectional view of Fig. II as seen projected on a vertical plane passing through III—III. Fig.

IV shows a plan or top view of Fig. I with part of a man hole cover broken off so as to show the top of the switch box $a$. Fig. V shows a transverse vertical section of a switch box of the species shown in Fig. I. Fig. VI is a section taken at VI—VI of Fig. IV. Fig. VII is a section of a switch box of the species shown in Figs. I and V, showing the switch of Fig. V when closed by the lifting of the trolley wire. Fig. VIII is a section of a switch box of the species shown in Figs. I and V, intended to illustrate the action of the spring $h$. Fig. IX shows a modified form of the general species of switch box and switch mechanism shown in Fig. I. Fig. X shows a vertical cross section of a railway conduit containing a modified form of the general species of switch box and switch mechanism shown in Fig. I. Fig. XI shows a modification of our invention wherein two trolley wires are used. Fig. XII shows a vertical longitudinal section of Fig. XI. Fig. XIII shows a vertical cross section of a conduit and switch box, the latter being a modification of the switch box shown in Fig. X. Fig. XIV shows the same arrangement as Fig. XIII with the exception of having two trolley wires and two sets of boxes instead of one. Fig. XV is a vertical longitudinal section of Fig. XIV. Figs. XVI, XVII, XVIII, XIX and XX show our system with a different species of switch box. Fig. XXI is a diagram illustrating a modification whereby the switch mechanism may be indirectly operated. Fig. XXII is a plan of one of the weights shown in Fig. XXI.

In our system as illustrated in Fig. I there are placed upon one or both sides of the slot, in suitable man noles provided for the purpose, boxes $a$, made preferably of porcelain or other non-conducting material, but cast iron, or any other material, will do. These boxes are made in two parts, being preferably divided on a horizontal plane passing through the center of the lever arm $l$, which by means of a flexible cord $k$ carries the trolley wire $w$, which latter is a bare copper wire, or other suitable conductor. The lever arm $l$ is preferably made of wood or other non-conducting material and having a recess or hole running from the collar $o$ to the exterior of the box $a$, through which passes a flexible cord $k$, either insulated or not and being attached at one end to the collar by means of a set screw as $s$, or by other suitable means, and at the other end to the trolley wire. To the lever arm $l$ is made fast a flexible packing of rubber, or other material suitable to the purpose, as $r$, formed in such a manner that when the top of the box $a$ is forced down by the bolts $x$, there will result a water and air tight junction between the box $a$, the flexible packing $r$ and the lever arm $l$. To the collar $o$ is made fast or attached thereto a spring $h$, having jaws $j$ formed at its outer end. In order that by creeping of the trolley wire no displacement shall occur to the lever arm $l$, there is a slot formed in its inner end, and through this slot passes the guide or projection $g$, made fast to the box $a$. Between the top and the bottom of the box $a$ is placed a packing $n$, Figs. V and VII, so as to form a water tight joint when the nuts $x$ are drawn home. Near the bottom of the box $a$ are formed lugs, in which are placed two pieces of wood $z$, to which is secured the plate $e$ having a projecting knife $i$ which enters between the jaws $j$ and thus forms a close spring contact. To the plate $e$ is also attached an insulated supply cable $q$, which passes out between the top and bottom of the box $a$ to a fuse or automatic cut-out box $b$, and from thence to the supply cable $c$, either buried in the street or carried on poles at its side or in an adjoining alley way. Upon the lever arm $l$ is placed a lug $m$ upon which one end of the spring $d$ rests; the other end of the spring resting against the top of the box $a$. To the trolley wire $w$ is made fast the clip $y$, having a high standard, the object of which is to prevent the flexible cord $k$ from interfering with the trolley or entangling itself in the trolley $v$ should the trolley wire $w$ be raised above its normal height, as is shown in Fig. VII. In the box $a$, and interposed between the knife $i$ and jaws $j$ may be placed oil, as shown in Fig. V, or oil and water, as shown in Fig. IX, which oil acts as an insulator and furthermore will not allow of the film of moisture to connect the knife $i$ with the jaws $j$. There may be placed in the box $a$, and upon which the oil will float, a liquid of greater specific gravity than oil, whose office shall be to reduce the temperature of the arc formed by the breaking of contact between the knife $i$ and the jaws $j$. In this event the heavier liquid should cover the knife $i$ as shown in Fig. V.

The spring $d$ may be eliminated entirely by making the lug $m$ of sufficient weight to operate the lever arm $l$ when the trolley wire is lifted up, as shown in Fig. VIII, which figure also shows the action of the spring $h$ when the trolley has passed a switch box for some distance and the lever arm $l$ has begun to return to its normal position.

Our system is adapted to the use of either one or two or more trolley wires. In Fig. I, one trolley wire is shown, the return circuit in this case being made through the rails $p$, one terminal of the generator being connected with the rails $p$ and the other with the supply cable $c$.

Fig. II shows in elevation the boxes $a$ which are connected through the fuse box or automatic cut-out $b$ to the supply cables $c$ running from the two or more generator terminals from which current is taken to the motor on the car when the trolley on moving along lifts the trolley wire sufficient to allow an extraneous force, such as a spring or gravity to form contact as shown in Figs. VII, VIII, XVIII and XIX. The trolley wire $w$ is shown in Fig. III in its normal position with the trolley wheel $v$ and conductor $w$ in dotted lines as they would appear when lifted up by the moving contact on the passage of a car.

In Fig. V $a$ is the switch box; $w$, the trolley wire; $y$, a clip having a high shank and made fast to the trolley wire; $k$, a flexible cord insulated or not and made fast to the clip $y$ at one end and to the set screw $s$ at the other; $l$, a lever arm, preferably of insulating material; $r$, a rubber or other flexible packing; $s$, a set screw used to fasten the collar $o$ to the lever arm $l$; $o$, a collar to which is attached the spring $h$ carrying the contact jaws $j$; $d$, a spring whose function it is to press downward or against the lever arm $l$; $m$, a lug or rest for the spring $d$; $g$, a stop and also a guide for the lever arm $l$; $i$, a contact knife made fast to the metal plate $e$; $e$, a metal plate screwed upon the two pieces of wood $z$; $z$, two pieces of wood filling the bottom of the box $a$; $q$, an insulated cable running to the supply cable $c$, as shown in Figs. I and II; $x$, bolts holding the top and bottom of the box $a$ together; $n$, a gasket or packing between the top and bottom of the box $a$.

A, Figs. V, VII and IX represents oil or other insulating fluid.

B, Fig. IX, represents a fluid such as water or other fluid, whose function it is to reduce the temperature of any arc formed by breaking the contact between the knife $i$ and the jaws $j$ in the box $a$.

In Fig. VI $g$ is an immovable guide and stop made fast to the box $a$. Fig. VI also shows the end of the lever arm $l$, jaws $j$, knife $i$, &c.

When the trolley has lifted the trolley wire enough, or more than enough to allow spring $d$ to press the lever arm $l$ down and form contact between the jaws $j$ and the knife $i$, as shown in Fig. VII, connection will be made between the working and supply conductors.

The action of the spring $h$ after the trolley has passed the box $a$ and the lever arm $l$ has partially recovered its normal position, is shown in Fig. VIII.

In Fig. IX $a$ is the switch box; $r'$, a hard rubber half sphere used in place of the rubber packing $r$, and $d'$ two coil wire springs used instead of the flat spring $d$.

In Fig. X the lever arm $l$ is replaced by pulleys. Also inside of box $a$ in this instance is placed another receptacle holding a temperature reducing fluid B, the inner vessel being entirely surrounded by the insulating fluid A, the jaws $j$ and knife $i$ in Fig. X being in this figure reversed in position with respect to each other from that shown in Fig. I. In this case also the return is made through the rails.

In Fig. XI there are shown two sets of conductors and two sets of boxes, one for the positive and one for the negative poles. This figure also shows the trolley as double and in position to form contact between the knife $i$ and the jaws $j$.

In Fig. XII $w$ is the trolley wire; $l'$, the holder for the pulley $p'$ to which is bolted cover $q'$; $t$, a bell insulator showing how the trolley wire $w$ may be suspended intermediate between the boxes $a$ if desired; $v$, the trolley wheel and $f$ the trolley bar.

In Fig. XIII $s'$ is a hollow standard made fast to the knife $i$ and designed to act as a guide. Around this standard in the upper chamber of the box $a$ is fixed a packing $k'$ to prevent evaporation of the liquids held below.

In Fig. XV it is shown how the various sections of the trolley wire or conductor $w$ may be insulated from each other while being mechanically connected together; $t'$ being an insulating block adapted to insulate one section of trolley wire from a contiguous section.

In Figs. XVI, XVII, XVIII, XIX and XX, the switch box $a$ is of a different construction from that shown in Fig. I, and is in itself equivalent to the lever arm "$l$" of Figs. VII and VIII, the rotation or oscillation of the switch box itself, in this case, operating to make and break contact between the working and supply conductors on raising and lowering the conductor $w$ on the passage of the trolley wheel or shoe. In other words the box "$a$" in this case acts as the lever arm "$l$" of Figs. VII and VIII. In this figure the box $a$ is held normally horizontal or in such a plane that the jaws $j$ and knife $i$ are separate. When the trolley lifts up the trolley wire $w$ the box $a$ will tip or rock on its supporting axis in the direction shown by the arrows in Figs. XVI, XIX, and XX, allowing the box $a$ to rotate against the weight $m'$ enough to bring the jaws $j$ into contact with the knife $i$, thus completing the electric connection between the supply cable $c$ and the motor on the car. The jaws $j$ and the knife $i$ are reversed in reference to each other in Figs. XVI and XIX. As the trolley leaves the vicinity of the box $a$ the weight of the trolley wire $w$ gradually brings the box $a$ back to its normal position, and just before the box $a$ reaches its normal position the spring $h$, Figs. XVI and XIX, snaps the jaws $j$ and knife $i$ asunder. In this arrangement of the box $a$ the branch cable $q$ is made flexible as shown to allow of the rocking motion of the box $a$ around its axis.

Figs. XVII and XX show how the box $a$, Fig. XVI and XIX, are hung in the conduit, being placed so that they may be easily removed by simply disconnecting cord $k$ from the box $a$ and lifting the box out of the hooks $h'$.

Fig. XIX shows in section the box $a$, Figs. XVII and XX, and the arrangement of its mechanism.

In Fig. XIX $a'$ is a trigger in the lower end of the lever arm $l$ adapted to engage the lug $a^2$ when the box $a$ is rotated on its axis. $a^2$ is a lug formed in the bottom of the box $a$. $m'$ is a weight attached to the shaft $c'$, which carries the arm $c^2$ and $c^3$. Upon the outer end of the arm $c^3$ is journaled the lever arm $l$. $x$ $x$ are set screws for holding on the top to which is attached all the switch mechanism of the box $a$.

The operation of the mechanism of the box $a$, Fig. XIX is as follows: As the trolley lifts the trolley wire $w$ sufficient to allow the box $a$ to assume the position shown by the dotted lines Fig. XIX, the lug $a^2$ engages the trigger $a'$ and carries the lever arm $l$ against one-half of the spring $h$ and through it against he weight $m'$. As the box $a$ continues to rotate the trigger $a'$ finally slips over the lug $d^2$ and one-half of the spring $h$ then snaps the knife $i$ into the jaws $j$ which electrically connects the trolley wire $w$ to the supply cable $c$ through the flexible conductor $q$. As the trolley leaves the box $a$ the latter begins to regain its normal position. As it does so the other half of the spring $h$ is first compressed and after a time the lips at the upper end of the lever arm $l$, one carried by the lever arm $l$ and the other by the weight $m'$, come in contact and the weight $m'$ carries the knife $i$ out of the jaws $j$, the spring $h$ acting to break any arc which may be formed between the jaws $j$ and knife $i$. In Fig. XXI, showing how these oscillating boxes may be indirectly rotated or rocked on their axes, or the switch mechanism operated by the conductor $w$ through the instrumentality of intermediate weight situated at a greater or less distance from the box $a$, M shows such a weight. This arrangement allows of the boxes $a$ being placed farther apart. It is not necessary in this case that the boxes $a$ shall have other than articulate mechanical connection with the cord $k$ and through the cord $k$ and weights M with the trolley wire $w$, but in the event the cord $k$ is not electrically connected to the mechanism of the box $a$ it is necessary to make a supplemental electric connection as shown in Fig. XXI at $k^2$.

The operation of the device shown in Fig. XXI is as follows: Suppose the car to move in the direction shown by the arrow, then when the trolley lifts the conductor $w$ up sufficiently, as seen at the right of Fig. XXI the weight or weights M rotate on their axes and rotate the box $a$ by means of the cord $k$, and as the trolley progresses to the center between the two first weights, the lift of the trolley is great enough to have both of the weights acting on the box $a$ before the trolley has reached the second weight. The first weight will then have commenced to regain its normal position. Thus there is a constant and steady pull on the box $a$ all the time the trolley is on the section of trolley wire, and electric contact is continuous as between the supply cable $c$ and the trolley wire $w$, and may be broken sometime after the trolley has left the section under discussion.

Having thus clearly set forth the different parts of our device and their office, we will proceed to show how their functions are performed in practical operation.

To each switch box $a$ is attached directly or through intermediate levers a section of the trolley wire $w$, insulated from the next contiguous section by an insulator $t'$, Fig. XV. The trolley wire may also be hung upon intermediate insulators as $t$ Fig. XV, in case of necessity. Now suppose that the supply cable $c$ is fed at the generator station with either a positive or negative current of electricity, then when the trolley is at or near the box $a$ or a weight M, the weight of the trolley wire being supported by the trolley, the spring $d$ of Fig. I, the weight M of Fig. XXI or the weight of the oscillating switch box of Figs. XVI, XVII, XVIII, XIX and XX, is allowed to form contact between the supply and working conductors. As the trolley passes onward the lever arm $l$ of Fig. I, or its equivalent, the switch box $a$ of Figs. XVI, XVII, XVIII, XIX and XX, begins to slowly regain its normal position, and the jaws $j$ clamp the knife $i$ firmly enough to hold them until such time as the spring $h$ will overcome their friction, when the contact will be suddenly and quickly broken by the action of the spring $h$, just before the lever arm $l$ of Fig. I or the box $a$ of Figs. XVI, XVII, XVIII, XIX and XX come to rest. This arrangement will tend to break any arc which may be formed between the knife $i$ and the jaws $j$. It is thus seen that there is no current in the trolley wire except when the car is upon the section in use, which may be of any length and contain one or more of the boxes $a$.

Having thus fully described our invention and its mode of operation, what we claim as new, and desire to secure by Letters Patent, is—

1. In a conduit electric railway system, containing a bare trolley wire or conductor made in sections insulated from each other, and being normally out of circuit, the combination of a switch box, preferably made water tight, and adapted to contain oil or other insulating fluid, with a lever arm, carrying a spring snap switch, actuated by a spring and connected mechanically and electrically by means of a flexible cord, preferably insulated, to the trolley wire or conductor.

2. In a conduit electric railway system, containing a bare trolley conductor, made in sections insulated from each other, and being normally out of circuit, the combination with a lever-arm, adapted on the passage of a car to form contact between the supply current and the motor on the car, of flexible cords supporting the trolley conductor and connecting with said lever-arm.

3. In a conduit electric railway system containing a bare trolley conductor, made in sections insulated from each other and being normally out of circuit, the combination of a switch box having a lever arm carrying a snap switch, and arranged so that after the passage of a car it will break contact, under oil, between the supply current and motor on the car, with flexible cords adapted to support the trolley conductor.

4. In a conduit electric railway system, containing a bare conductor made in sections insulated from each other, and being normally out of circuit, the combination of a switch box, as $a$, whose mechanism is rendered free to operate by the passage of a car, with a flexible cord made fast and in electrical contact at one end to the trolley wire or conductor, and on the other hand, made fast to and in electrical contact with the snap switch and mechanism contained in the switch box $a$.

5. In a conduit electric railroad system using a bare trolley conductor made in sections and insulated from each other, and being normally out of circuit or connection with the generating plant, the combination of such trolley wire or conductor having clips with high shanks as $y$, with a flexible cord attached both to the trolley clip $y$ and the mechanism inside the box $a$.

6. In an electric railroad system having a bare trolley conductor made in sections and being held normally out of circuit by means of the weight of the trolley conductor, the combination of a supply cable, as $c$, a fuse or automatic cut out box, as $b$, a switch box $a$, and mechanism contained in the switch box $a$, adapted to make contact by some extraneous force, such as gravity or a spring under oil or other liquid insulator, between the supply circuit and the return circuit through the motor on the car, upon the passage of a car.

7. In a conduit electric railroad system having a bare trolley conductor made in sections and being held normally out of circuit, the combination of a trolley wire or conductor carried by a flexible cord attached to and in electrical contact with both the trolley conductor and the mechanism in the switch box $a$, and adapted by means of a switch to form contact between the supply circuit and the motor on the car, in or under an insulating liquid upon the passage of a car, with an under-running contact device.

8. In a conduit electric railway system containing a bare trolley conductor, made in sections insulated from each other and being normally out of circuit, the combination of a switch box adapted after the passage of a car to break contact by means of a switch under oil, or other fluid insulator, as between the supply current and the motor on the car, flexible cords suspending the trolley conductor from above, with an under-running contact device.

9. In a conduit electric railway system, using a bare trolley conductor, made in sections insulated from each other and being normally out of circuit, the combination of a switch box adapted by means of a switch to form electric contact between the trolley conductor and supply conductor, in a temperature reducing fluid, upon the passage of a car, with a trolley conductor flexibly suspended in the conduit.

10. In a conduit electric railway system using a bare trolley conductor made in sections insulated from each other, and normally out of circuit, the combination of a switch box adapted by means of a switch to make electric contact between the trolley conductor and supply conductor by means of an extraneous force, such as gravity or a spring independent of the lifting force of the trolley which force becomes operative on the passage of a car; a trolley conductor flexibly suspended from above in said conduit, with an under-running contact device.

11. In a conduit electric railway system using a bare trolley conductor, made in sections insulated from each other and normally out of circuit, the combination of a lever-arm adapted by means of a switch to make and break contact electrically through the agency of an extraneous force, such as gravity or a spring, independent of the lifting power of the trolley, which force becomes operative on the passage of a car, a trolley conductor flexibly suspended from said lever-arm and in electrical connection with the switch mechanism in said lever-arm, with an under-running contact device.

12. The combination of a conduit, a working conductor therein, normally held out of electric connection with the supply conductors or feeders, by the weight of said working conductor, and a switch for making and breaking said connection between the working and supply conductors; with a flexible cord connecting said working conductor and said switch.

13. The combination of a conduit, a working conductor therein normally held out of electric connection with the supply conductors or feeders, and a switch for making and breaking said connection between the working and supply conductors; with a flexible cord connecting said working conductor and said switch.

14. The combination of a conduit, a working electric conductor therein normally held out of electric connection with the supply conductors or feeders by the weight of said working conductor, a switch adapted to making and breaking electric connection between said working and supply conductors and operated by an extraneous force such as gravity or a spring independent of the lifting power of the trolley, which force becomes operative by the raising of the said working conductor on the passage of the moving contact or trolley, and an under-running contact device adapted to raising and lowering said working conductor.

15. In an electric railroad system using a flexibly suspended trolley conductor or wire, the combination of such trolley conductor or wire, means for flexibly suspending the same and clips with high shanks or standards as $y$ fastened to said trolley conductor or wire and adapted to suspend said trolley wire by means of a flexible cord fastened at one end to the standard or shank of said clip and at the other to the point of support for said trolley wire.

16. In an electric railroad system, the combination of a bare working or trolley conductor made in sections and normally held out of circuit or electrical connection with the supply conductors or feeders by the weight of said working conductor, a switch for making electrical connection between said working and supply conductors operated by means of an extraneous force such as gravity or a spring independent of the lifting power of the trolley, which force becomes operative by the raising of said working conductor.

17. The combination of a conduit, a working electric conductor therein normally held out of electric connection with the supply conductors or feeders, with a switch-box containing a "snap-switch" adapted to making and breaking electric connection between said working and supply conductors by means of an extraneous force such as gravity or a spring independent of the lifting power of the trolley, which force becomes operative by the raising of the said working conductor on the passage of the moving contact or trolley.

TYRE C. HUGHES.
A. WELLINGTON ADAMS.

Witnesses:
W. F. RICHARDS,
CHAS. F. KROUB.